United States Patent
Baltes

(10) Patent No.: US 8,539,984 B2
(45) Date of Patent: Sep. 24, 2013

(54) HYDRAULIC ACCUMULATOR, IN PARTICULAR A MEMBRANE ACCUMULATOR

(75) Inventor: Herbert Baltes, Losheim (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 2225 days.

(21) Appl. No.: 10/508,661

(22) PCT Filed: Mar. 21, 2003

(86) PCT No.: PCT/EP03/02961
§ 371 (c)(1),
(2), (4) Date: Sep. 22, 2004

(87) PCT Pub. No.: WO03/085270
PCT Pub. Date: Oct. 16, 2003

(65) Prior Publication Data
US 2005/0139277 A1    Jun. 30, 2005

(30) Foreign Application Priority Data
Apr. 10, 2002  (DE) ................................ 102 15 846

(51) Int. Cl.
*F16L 55/04* (2006.01)
(52) U.S. Cl.
USPC .......................................................... 138/30
(58) Field of Classification Search
USPC ..................................... 138/30, 31
See application file for complete search history.

(56) References Cited

U.S. PATENT DOCUMENTS

| | | | | | |
|---|---|---|---|---|---|
| 2,283,439 | A | * | 5/1942 | Herman | 138/30 |
| 2,290,337 | A | * | 7/1942 | Knauth | 138/30 |
| 2,378,517 | A | * | 6/1945 | Trautman | 138/30 |
| 2,697,451 | A | * | 12/1954 | Knauth | 138/30 |
| 2,804,884 | A | * | 9/1957 | Knox | 138/30 |
| 3,442,293 | A | * | 5/1969 | Erdmann | 138/30 |
| 3,461,914 | A | * | 8/1969 | Sugimura et. al. | 138/30 |

(Continued)

FOREIGN PATENT DOCUMENTS

| DE | 26 23 950 A | 12/1977 |
|---|---|---|
| DE | 28 17 011 A | 10/1979 |
| EP | 0 360 648 A | 3/1990 |

OTHER PUBLICATIONS

Mechanical Translation of DE2623950 reference to Baumanns with a publication date of Dec. 1, 1977 from European Patent Office.*

*Primary Examiner* — James Hook
(74) *Attorney, Agent, or Firm* — Roylance, Abrams, Berdo & Goodman LLP

(57) ABSTRACT

A hydraulic accumulator, preferably a membrane accumulator, in particular for damping pulsations in fluid circuits, includes an accumulator housing (12) with at least one inlet (14) and an outlet (16) for the fluid for damping. A separating element (18), preferably in the form of a membrane, separates a gas reservoir (20) from a fluid chamber (22) within the accumulator housing (12). A hydraulic accumulator with high working capacity of high reliability which little space requirement despite high accumulation capacity for the working gas in the gas reservoir (20) can be achieved. A support device (24) within the accumulator housing (12), extends within the gas reservoir (20) and forms a possible support for the separating element (18). The gas reservoir (20) of the accumulator housing (12) is sufficiently large in dimension that the total necessary gas volume is retained within the accumulator housing (12) itself. The membrane is formed from an elastic material, in particular a rubber material of polytetrafluoroethylene or compounds thereof, as a gas barrier layer.

13 Claims, 1 Drawing Sheet

(56) References Cited

U.S. PATENT DOCUMENTS

| | | | |
|---|---|---|---|
| 3,474,830 A * | 10/1969 | Hertell | 138/30 |
| 3,741,692 A * | 6/1973 | Rupp | 417/540 |
| 4,312,382 A | 1/1982 | Gebauer | |
| 4,408,635 A * | 10/1983 | Packer | 138/30 |
| 4,556,087 A * | 12/1985 | Casilli | 138/30 |
| 5,524,671 A | 6/1996 | Yoshida et al. | |
| 5,763,034 A * | 6/1998 | Nishino et al. | 428/36.91 |
| 5,797,430 A * | 8/1998 | Becke et al. | 138/30 |
| 6,019,134 A * | 2/2000 | Onishi | 138/30 |
| 2005/0065377 A1* | 3/2005 | Katsuura et al. | 568/34 |
| 2005/0147536 A1* | 7/2005 | Iwata | 422/100 |
| 2006/0079162 A1* | 4/2006 | Yamashita et al. | 451/444 |

* cited by examiner

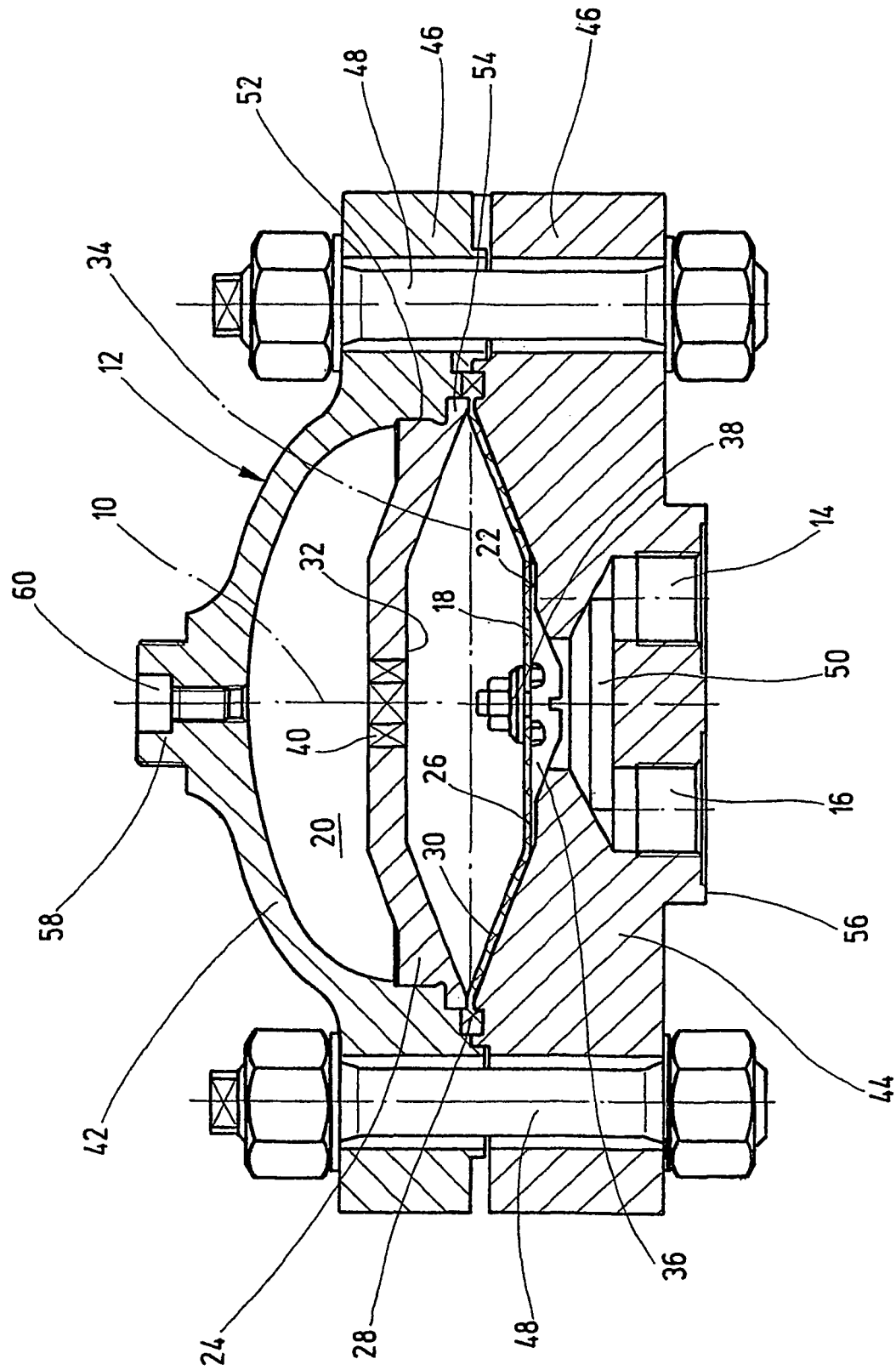

HYDRAULIC ACCUMULATOR, IN PARTICULAR A MEMBRANE ACCUMULATOR

FIELD OF THE INVENTION

The present invention relates to a hydraulic accumulator, in particular a membrane accumulator, specifically for damping pulsations in fluid circuits. The accumulator has an accumulator housing with at least one inlet and an outlet for the fluid to be damped. A separating element, preferably in the form of a membrane, separates a gas supply chamber from a fluid chamber inside the accumulator housing.

BACKGROUND OF THE INVENTION

Depending on the mode of operation, hydraulic accumulators are based on the principle of bubble and membrane accumulators or liquid sound dampers. In hydropneumatic dampers, the compressibility of a gas (mostly nitrogen) is used for damping. In the case of a bladder accumulator, for example, the bladder is compressed or expanded as a function of the magnitude of the variations in pressure. A similar behavior is exhibited by membrane accumulators as well. Specifically, hydropneumatic dampers (pulse-tone pulsation dampers) were developed because damping may be impaired because of disadvantageous connection of the hydraulic fluid to the volume of gas when standard bladder or membrane accumulators are used. Dampers of this type have an in-line connecting block by means of which the variations in volume or pressure are optimally coupled to the gas volume. Good damping properties up to a frequency of around 500 Hz can be obtained with these dampers (see Mannesmann-Rexroth design projects "Konstruktion von Hydroanlagen" (Construction of Hydraulic Facilities), Der Hydrauliktrainer, Vol. 3, 1st Edition, page 106).

In conventional solutions readily available commercially, a connecting point is provided in the accumulator housing to increase the gas supply volume by mounting on the gas supply side an accumulator cylinder in which the additional operating gas, in particular in the form of nitrogen, is stored. Such solutions are costly in manufacture, and are geometrically large. Sealing problems may arise at the connecting point in question, leading to loss of operating gas. To improve the solutions, it has already been proposed that the gas supply chamber in the accumulator housing itself be enlarged and that additional supply cylinders connected to the accumulator housing be eliminated. However, enlargement of the gas supply chamber in the accumulator housing also increases free, travel for the separating element or separating membrane, so that it is subjected to heavy wear, such as by folding and overstretching processes, so that failure of the accumulator device soon ensues.

The solutions, discussed in the foregoing with the accumulator cylinder of operating gas mounted on the device, allow reduction of the clear path of displacement inside the accumulator housing for the separating element. However, on the whole, the operating capacity of the accumulator is adversely affected, especially with respect to pulsation damping.

In addition, the conventional solutions have separating elements of an elastomer material which are essentially gas-permeable to a certain extent. Loss of gas due to diffusion and permeation processes occurs in the long term. The gas supply is transferred to the fluid side.

SUMMARY OF INVENTION

Objects of the present invention are to provide an improved hydraulic accumulator so that the operating capacity of the accumulator is improved and requires only little installation space, and gas losses are reduced to the greatest extent.

These objects are basically attained with a hydraulic accumulator having a mounting device located inside the accumulator housing. The mounting device is positioned inside the gas chamber or delimits it, and provides the possibility of installing the separating element. In addition, the dimensions of the gas supply chamber are large enough that the entire gas volume required is provided in the accumulator housing itself. Additional accumulator cylinders of operating gas on the accumulator housing may be eliminated. In addition to reduced installation space, this configuration provides the advantage of the absence of potential leakage points with the accompanying loss of gas. Since a mounting device is provided for the separating element, less severe operating conditions are possible and incidents of failure of the separating element are prevented to the greatest extent possible.

In a preferred embodiment of the hydraulic accumulator of the present invention, the membrane is formed of an elastomer material, a rubber material in particular, having polytetrafluoroethylene (Teflon®) or its compounds as a gas barrier layer. In comparison to the conventional solutions, gas diffusion and permeation processes in the direction of the fluid side are significantly reduced by a separating membrane provided with a gas barrier layer. This layer contributes to preservation of the operating capacity of the accumulator. Since less gas is lost, less gas also is required for an optimized operating capacity of the accumulator. With the performance remaining equal, an accumulator of smaller geometric dimensions may be built.

Other objects, advantages and salient features of the present invention will become apparent from the following detailed description, which, taken in conjunction with the annexed drawing, discloses preferred embodiments of the present invention.

BRIEF DESCRIPTION OF THE DRAWINGS

Referring to the drawings which form a part of this disclosure:

FIG. 1 is a diagrammatic, side elevational view in section of a hydraulic accumulator according to an embodiment of the present invention.

DETAILED DESCRIPTION OF THE INVENTION

The hydraulic accumulator illustrated in FIG. 1 is in the form of a membrane accumulator designed to be more or less symmetrical in rotation in relation to its longitudinal axis 10. The accumulator serves particularly for damping pulsations in fluid circuits, particularly hydraulic circuits. The hydraulic accumulator has an accumulator housing 12, having on its lower side at least one inlet 14 and one outlet 16. A separating element 18, in the form of a separating membrane, is mounted inside the hydraulic accumulator. The separating element 18 separates a gas supply chamber 20 from a fluid chamber 22. The separating element 18 is shown in FIG. 1 in its initial state, when the fluid chamber 22 has been more or less emptied by way of the outlet 16 and when the operating gas occupies more or less the entire volume of the gas supply chamber 20.

Depending on the particular operating position of the separating element 18, in which position this element is moved upward as viewed in the direction of FIG. 1, the fluid chamber 22 is correspondingly enlarged and simultaneously the gas volume in the gas supply chamber 20 is reduced. A mounting device 24 is mounted in the accumulator housing 12. This mounting device extends inside the gas supply chamber 20 or delimits this chamber when the upper side of the separating element 18, in its fully raised position, is in contact with the lower side of the mounting device 24. As seen in FIG. 1, the dimensions of the gas supply chamber 20 are large enough, so that the entire gas volume required is supplied in the accumulator housing 12 itself without an additional mountable accumulator cylinder.

The separating element 18 is a membrane of an elastomer material, such as rubber material. Polytetrafluoroethylene or compounds of this substance are used as a gas barrier layer on the membrane. The substance polytetrafluoroethylene is generally known by the trade name Teflon, which was originally produced by the DuPont manufacturing company. At least one side, the upper side of the membrane, for example, is coated with polytetrafluoroethylene. In addition or as an alternative, provision may be made such that sealing blocks, that is, agglomerates of polytetrafluoroethylene components, are introduced into the rubber membrane itself. If a gas molecule then encounters such a sealing block inside the membrane, it is directed back toward the gas side and diffusion is still possible only in the intervals between the sealing blocks. This structure reduces the possibility of permeation. In that configuration, the membrane is still highly flexible.

As FIG. 1 also shows, the separating element 18, as viewed in cross-section and in the initial state. In that state, the separating element is designed with a level central bottom area 26. In the direction of the annular part of fastening edge 28 of the separating element to the mounting surface 24, a membrane surface 30 is inclined at an assignable angle to the accumulator housing 12, for example an angle ranging from 20° to 30°, and preferably 25°. Reliable uncoiling of the separating element 18 inside the accumulator housing 12 is obtained as a result of this configuration, with no need for fear of tearing or the like. In particular, the mounting device 24 has, at least on the mounting side 32, a shape figuratively rotated through 180° around the transverse axis 34 of the accumulator housing 12 (i.e., mirror image) that corresponds to the shape of the separating element 18 when the separating element is in its initial state.

The separating element 18 is provided in its center with a closing plate 36 which can close off the inlet 14 and the outlet 16 when the separating element 18 is in the initial state shown in FIG. 1. The closing plate 36 is rigidly connected to the separating element 18 by a bolted connection 38. A through opening 40 coaxial with the longitudinal axis 10 of accumulator housing 12 is present in the mounting device 24 for engagement of a part of the bolted connection 38, in particular one in the form of the upper part of the screw bolt together with cap nut. By the opening 40 in the form of an internal hexagon, the parts of the gas supply chamber 20 above the mounting device 24 are in fluid communication with the parts of the gas supply chamber 20 extending between the upper side of the separating element 18 and the lower mounting side 32 of the mounting device 24.

The two housing halves 42 and 44 of the accumulator housing 12 are provided on their external circumferential sides with fastening flanges 46. Diametrically opposite screw bolts 48 extend through fastening flanges 46 to permit assembly of the accumulator housing 12. The inlet 14 and the outlet 16 are mounted in parallel with the longitudinal axis 10 of the accumulator housing 12, and discharge into the fluid chamber 22 via a common antechamber 50. An optimized flow of the fluid medium into and out of the fluid chamber 22 is thereby obtained. A contribution to this optimized flow also is made by the antechamber tapering in the direction of the closing plate 36.

The mounting device 24 may be bolted from its external circumferential side into the interior of the accumulator housing 12 by a screw thread 52. The separating element 18 is additionally secured in the accumulator housing 12 along its fastening edge 28 on the external circumferential side by a shoulder-like widening 54 on the lower side of the mounting device 24. The mounting surface of the widening 54 on the external circumferential side is at least in part in contact with the edge-like widening of the fastening edge 28 of the separating element 18.

As FIG. 1 also shows, the upper housing half 42 is configured in cross-section as a cavity elliptical or hemispherical in cross-section. The lower housing half 44 on the fluid side 22 is configured as a level plate 56, at least in the area on the inlet and outlet sides. The upper housing half 42 has a connecting point 58 in its center closed by a screw plug 60, which plug is removed to permit refilling of the accumulator. The processes involved are known, so that they will not be described in detail. The operating capability of the accumulator is correspondingly increased by choice of the cavity on the gas supply side without the need for use of additional assemblies such as additional cylinders or the like.

The hydraulic accumulator of the present invention possesses high operating capability, requires little installation space, and has a long service life, since the separating element 18 may be provided with a gas barrier layer. In addition, the uncoiling of the separating element 18 is controlled as desired and overstretching of the separating membrane is reliably prevented by the appropriately configured mounting side 32 of the mounting device 24.

While one embodiment has been chosen to illustrate the invention, it will be understood by those skilled in the art that various changes and modifications can be made therein without departing from the scope of the invention as defined in the appended claims.

What is claimed is:

1. A hydraulic accumulator, comprising:
   an accumulator housing having at least one inlet and one outlet for fluid to be damped, and having a gas chamber and a fluid chamber therein, said gas chamber within said housing storing an entire volume of gas for the hydraulic accumulator;
   a membrane separating element inside said accumulator housing separating said gas chamber and said fluid chamber;
   a mounting device inside said accumulator housing extending one of within said gas chamber and along a limit of said gas chamber depending on positioning of said separating element, said separating element being supported on said mounting device;
   a closing plate provided at a center of said separating element and movable between an open position allowing fluid to flow into and out of said fluid chamber through said inlet and outlet and a closed position preventing fluid flow into and out of said fluid chamber through said inlet and said outlet, said closing plate being rigidly connected to said separating element by a bolted connection; and
   a through opening in said mounting device for engagement of a part of said bolted connection.

2. A hydraulic accumulator according to claim 1 wherein said separating element is formed of elastomeric material with a gas barrier layer of polytetrafluoroethylene or compounds thereof.

3. A hydraulic accumulator according to claim 2 wherein said gas barrier layer is coated on one side of said separating element.

4. A hydraulic accumulator according to claim 2 wherein said gas barrier layer comprises sealing blocks.

5. A hydraulic accumulator according to claim 1 wherein said separating element in an initial state thereof has a level bottom area, an annular circumferential area fastened to said accumulator housing, and a membrane surface extending between said bottom area and said circumferential area inclined at an angle to said mounting device.

6. A hydraulic accumulator according to claim 5 wherein said mounting device comprises a mounting side having a shape corresponding to a mirror image of said separating element in said initial state thereof.

7. A hydraulic accumulator according to claim 1 wherein said accumulator housing comprises first and second housing halves with fastening flanges on external circumferential sides thereof; and diametrically opposite screw bolts extend through said fastening flanges for assembly of said housing.

8. A hydraulic accumulator according to claim 1 wherein said inlet and said outlet extend into said fluid chamber parallel to a longitudinal axis of said accumulator housing via a common antechamber.

9. A hydraulic accumulator according to claim 1 wherein said mounting device is thready engaged with an interior portion of said accumulator housing on an external circumferential side thereof; and said separating element is retained in said accumulator housing along an external circumferential fastening edge engaging a shoulder widening in said accumulator housing.

10. A hydraulic accumulator according to claim 1 wherein a first part of said accumulator housing defining said gas chamber comprises a cavity elliptical in cross section; and a second part of said accumulator housing is on a fluid side thereof, is a substantially level plate and contains said inlet and said outlet.

11. A hydraulic accumulator according to claim 1 wherein a first part of said accumulator housing defining said gas chamber comprises a hemispherical cavity; and a second part of said accumulator housing is on a fluid side thereof, is a substantially level plate and contains said inlet and said outlet.

12. A hydraulic accumulator according to claim 1 wherein said bolted connection and said through opening have substantially similar shapes.

13. A hydraulic accumulator according to claim 1 wherein said bolted connection is entirely within said accumulator housing.

* * * * *